United States Patent
Meza et al.

(10) Patent No.: US 9,809,058 B2
(45) Date of Patent: *Nov. 7, 2017

(54) TIRE WITH RUBBER TREAD OF INTERMEDIAL AND LATERAL ZONES WITH PATH OF LEAST ELECTRICAL RESISTANCE

(71) Applicant: The Goodyear Tire & Rubber Company, Akron, OH (US)

(72) Inventors: Roberto Cerrato Meza, North Canton, OH (US); Junling Zhao, Hudson, OH (US); Austin Gale Young, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 386 days.

This patent is subject to a terminal disclaimer.

(21) Appl. No.: 14/609,540

(22) Filed: Jan. 30, 2015

(65) Prior Publication Data

US 2016/0059634 A1 Mar. 3, 2016

Related U.S. Application Data

(63) Continuation-in-part of application No. 14/470,166, filed on Aug. 27, 2014, now abandoned.

(51) Int. Cl.
*B60C 1/00* (2006.01)
*B60C 11/00* (2006.01)
(Continued)

(52) U.S. Cl.
CPC ........ *B60C 11/0041* (2013.01); *B60C 1/0016* (2013.01); *B60C 11/0008* (2013.01);
(Continued)

(58) Field of Classification Search
CPC ............... B60C 1/0016; B60C 1/0025; B60C 2001/0083; B60C 11/0008;
(Continued)

(56) References Cited

U.S. PATENT DOCUMENTS

| 4,385,653 A | 5/1983 | Okazaki et al. |
| 6,230,773 B1 * | 5/2001 | Sandstrom ............ B60C 1/0025 |
| | | 152/517 |

(Continued)

FOREIGN PATENT DOCUMENTS

| DE | 19812934 | 12/2002 | ............ B60C 11/18 |
| EP | 0718127 | 6/1996 | ............ B60C 19/08 |

(Continued)

OTHER PUBLICATIONS

EPO Search Report received by Applicant dated Feb. 1, 2016.

*Primary Examiner* — Eric Hug
(74) *Attorney, Agent, or Firm* — Henry C. Young, Jr.

(57) ABSTRACT

The invention relates to a tire having a rubber tread of a circumferentially zoned tread. The tread zones are comprised of three circumferential load bearing zones, with each zone containing a portion of the running surface of the tread, comprised of a silica-rich intermedial rubber zone positioned between and extending beneath two carbon black-rich lateral tread zones. The tread configuration contains an underlying carbon black-rich base rubber layer. The intermedial and stratified lateral zones are comprised of rubber compositions having differentiated rebound physical properties. A path of least electrical resistance extends from a lateral carbon black-rich rubber tread zone to the carbon black-rich tread base layer by an extension of a lateral tread zone or by an intermediate carbon black-rich rubber bridge.

13 Claims, 4 Drawing Sheets

(51) Int. Cl.
*B60C 19/08* (2006.01)
*B60C 11/03* (2006.01)

(52) U.S. Cl.
CPC ....... *B60C 11/0058* (2013.01); *B60C 11/0311* (2013.01); *B60C 19/082* (2013.01); *B60C 11/0306* (2013.01); *B60C 2001/0083* (2013.01); *B60C 2011/0016* (2013.01); *B60C 2011/0025* (2013.01)

(58) Field of Classification Search
CPC ..... B60C 2011/0016; B60C 2011/0025; B60C 11/0041; B60C 11/005; B60C 11/0058; B60C 11/0066; B60C 19/08; B60C 19/082; B60C 19/086
USPC ........... 152/209.5, 209.1, 905, 152.1, DIG. 2
See application file for complete search history.

(56) References Cited

U.S. PATENT DOCUMENTS

| | | | |
|---|---|---|---|
| 6,959,744 B2 | 11/2005 | Sandstrom et al. | 152/209.5 |
| 7,131,474 B2 | 11/2006 | Sandstrom | 152/152.1 |
| 7,559,348 B2 | 7/2009 | Puhala et al. | 152/209.4 |
| 7,789,117 B2 | 9/2010 | Puhala et al. | 152/209.4 |
| 8,662,123 B2 | 3/2014 | Puhala et al. | 152/209.4 |
| 9,539,860 B2 * | 1/2017 | Zhao | B60C 11/0058 |
| 9,545,823 B2 * | 1/2017 | Zhao | B60C 11/0058 |
| 2007/0017617 A1 | 1/2007 | Lafrique et al. | |
| 2009/0107597 A1 | 4/2009 | Loewenhaupt et al. | 152/209.5 |

FOREIGN PATENT DOCUMENTS

| | | | |
|---|---|---|---|
| EP | 0798142 | 3/1998 | ............ B60C 11/00 |
| EP | 1609624 A1 | 12/2005 | |
| JP | 2009051314 | 3/2009 | |

* cited by examiner

TIRE WITH RUBBER TREAD OF INTERMEDIAL AND LATERAL ZONES WITH PATH OF LEAST ELECTRICAL RESISTANCE

The invention relates to a tire having a rubber tread of a circumferentially zoned tread. The tread zones are comprised of three circumferential load bearing zones, with each zone containing a portion of the running surface of the tread, comprised of a silica-rich intermedial rubber zone positioned between and extending beneath two carbon black-rich lateral tread zones. The tread configuration contains an underlying carbon black-rich base rubber layer. The intermedial and stratified lateral zones are comprised of rubber compositions having differentiated rebound physical properties. A path of least electrical resistance extends from a lateral carbon black-rich rubber tread zone to the carbon black-rich tread base layer by an extension of a lateral tread zone or by an intermediate carbon black-rich rubber bridge.

BACKGROUND FOR THE INVENTION

Tire treads for pneumatic tires typically have running surfaces of a unitary rubber composition and therefore rubber properties attributed to the tread rubber composition across the face of the tread. The tread is usually composed of a lug and groove configuration composed of ground-contacting lugs with intervening grooves between the lugs.

Tires intended for heavy duty, in a sense of carrying large loads, such as for example truck tires, are typically intended to experience internal heat generation during the service, or operation, of the tire and to experience considerable stress at lateral, portion(s) of the tread, including tread grooves contained in the tread's ground-contacting lateral tread zones due to, for example, vehicular cornering and tire scuffing against roadside objects including, for example, roadside curbs. When such tire stress is excessive, a surface cracking of a surface of a groove wall contained in a stratified lateral zone of the tread may occur in response to the considerable stress.

The outer, ground-contacting, tread cap rubber layer is typically comprised of a relatively low hysteretic rubber composition to promote relatively low internal heat generation as the tire is used in service as evidenced by relatively high rubber rebound and relatively low tan delta physical properties to, in turn, thereby promote a low rolling resistance of the tire tread as well as extended tread shoulder groove durability.

For this invention, it is proposed to provide the outer tread cap rubber layer in a form of circumferential zones of significantly different physical properties, particularly rubber compositions of differing physical properties such as hot rebound (100° C.) properties which are indicative of hysteresis of the rubber composition and predictive of rate of internal heat generation during use of the tire and also predictive of rolling resistance of the tire. For this invention, such tread zones are provided as a silica-rich intermedial rubber zone to promote lower hysteresis with resultant lower internal heat build-up across a major portion of the breadth of the tire tread positioned between and underlying carbon black-rich lateral tread rubber zones.

In particular, it is proposed to provide the silica-rich intermedial rubber zone, which extends across a major portion of the carbon black rich underlying tread base rubber layer, with a higher 100° C. hot rebound property, thereby a lower hysteresis property, than the overlying carbon black-rich lateral tread rubber zones to promote a relative maximization of reduced internal heat build-up within the tread. The lateral tread zone rubber composition is therefore proposed to have a relatively lower 100° C. hot rebound property, thereby a higher hysteresis. It is further desired for the lateral tread zone rubber composition to have a greater or equal, preferably greater tear resistance property compared to the intermedial tread zone rubber, particularly to reinforce tread grooves contained in the stratified lateral tread zones.

Historically, tires have heretofore been proposed having an outer surface composed of a plurality of circumferential zones of rubber compositions to promote various properties for the tread's running surface.

For example, see U.S. Pat. Nos. 8,662,123; 7,789,117; 7,559,348; 7,131,474 and 6,959,744; Patent Publication Nos. 2007/0017617 and 2009/0107597; and EP0718127, EP0798142 and DE19812934.

However, it is hereby proposed to provide a tire with tread containing a combination of circumferential intermedial and lateral zones of rubber compositions to promote significantly differentiated physical properties to include rebound properties to therefore promote differentiated hysteresis properties. The higher rebound property (e.g. lower hysteresis property) for the tread intermedial zone layer, as compared to the lateral tread zone layer, is desired to promote, or maximize, a beneficially lower internal heat build up for the tread.

In this manner then, the central portion of the tread is a dual layered composite of an intermedial tread cap rubber zone layer and tread base rubber layer. The lateral portions of the tread are triple layered composites of the lateral tread rubber zones, the portion of the intermedial tread zone which extends beneath and underlies the lateral tread zones and the tread base rubber layer which underlies the intermedial tread zone.

The tire tread it thereby comprised of a cooperative layered composite of the aforesaid circumferential rubber layers.

In one embodiment, tread grooves are contained in both the intermedial tread zone and the lateral tread zones. By providing the lateral tread zone rubber layers with a tear resistance property, it is intended that tear resistance of the surface of the grooves contained in the lateral portion of the tread is promoted.

In the description of this invention, the terms "rubber" and "elastomer" may be used interchangeably, unless otherwise provided. The terms "rubber composition," "compounded rubber" and "rubber compound" may be used interchangeably to refer to "rubber which has been blended or mixed with various ingredients and materials" and such terms are well known to those having skill in the rubber mixing or rubber compounding art. The terms "cure" and "vulcanize" may be used interchangeably unless otherwise provided. The term "phr" may be used to refer to parts of a respective material per 100 parts by weight of rubber, or elastomer.

SUMMARY AND PRACTICE OF THE INVENTION

In accordance with this invention, a tire is provided having a circumferential rubber tread composed of a cap/base configuration comprised of an outer tread cap rubber layer with a lug and groove configuration with the outer portions of the tread lugs providing the running surface of the tread, and a tread base rubber layer underlying the outer tread cap rubber layer;

wherein the outer tread cap rubber layer is composed of three circumferential load bearing zones comprised of a silica-rich intermedial tread zone rubber layer positioned between and extending beneath two carbon black-rich lateral tread zone rubber layers to thereby underlie the lateral tread zone rubber layers and overlay the carbon back-rich tread base rubber layer;

wherein outer tread lug surfaces of the intermedial tread zone rubber layer and the lateral tread zone rubber layers comprise the running surface of the tread;

wherein rubber composition of the intermedial tread zone rubber layer has a 100° C. hot rebound property greater than the 100° C. hot rebound property of the rubber composition of the lateral tread rubber layers;

wherein a path of least electrical resistance extends from said carbon black-rich lateral rubber tread zone to the carbon black-rich tread base rubber layer by an extension of a lateral tread zone layer which extends to and joins said tread base rubber layer or by an intermediate carbon black-rich rubber bridge which extends between and joins said lateral tread zone rubber layer and said tread base rubber layer.

The silica rich rubber composition of the intermedial tread zone rubber layer contains at least 40 phr of precipitated silica (synthetic amorphous precipitated silica) and a maximum of 30 phr of rubber reinforcing carbon black and is therefore relatively electrical resistive (relatively electrically non-conductive, relative to the carbon black rich rubber compositions of the tread configuration).

The rubber reinforcing carbon black-rich rubber compositions of the lateral tread zone rubber layer, tread base rubber layer and rubber bridge (extending between said lateral tread zone rubber layer and said tread base rubber layer to create the path of least electrical resistance) contains at least 40 phr of rubber reinforcing carbon black and may also contain precipitated silica reinforcement.

Said silica reinforcement is used together with a silica coupling agent as will be hereinafter discussed.

In one embodiment, the value of the 100° C. hot rebound property of the intermedial tread zone rubber composition is at least about 4 units greater than the 100° C. hot rebound property value of the stratified tread zone rubber composition.

For example, the 100° C. hot rebound value of the intermedial tread zone rubber composition may be in arrange of from about 60 to about 80 percent and the 100° C. hot rebound value of the rubber composition of the tread zone rubber composition may be in a range of from about 56 to about 76 so long as the 100° C. rebound values differ by at least about 4 units (e.g. percentage units, for example, a hot rebound value of 80 percent for the intermedial zone rubber composition and hot rebound value of 76 percent, or less, for the lateral tread zone rubber composition).

In one embodiment, it is further desired for the stratified lateral tread zone rubber composition to have a greater or equal, preferably greater, tear resistance property than the intermedial tread zone rubber.

The elastomers of the rubber compositions of the intermedial tread rubber zone and lateral tread rubber zones may be the same or different so long as the 100° C. hot rebound property of the rubber composition of the intermedial tread rubber zone is greater than the 100° C. hot rebound property of the rubber composition of the stratified lateral rubber zones.

For example, as hereinbefore discussed, the rubber composition of the intermedial zone is silica-rich in a sense of containing at least 40 phr of precipitated silica and a maximum of 30 phr of rubber reinforcing carbon black so long as the 100° C. hot rebound property of the intermedial tread zone is greater than the 100° C. hot rebound property of the stratified tread zones.

For example, as hereinbefore discussed, rubber composition of the lateral tread lateral zones and tread base rubber layer are composed of carbon black-rich rubber compositions in a sense of containing at least 40 phr of rubber reinforcing carbon black zones so long as the 100° C. hot rebound property of the intermedial tread zone is greater than the 100° C. hot rebound property of the stratified tread zones.

In one embodiment, the span of the running surface of the intermedial tread zone rubber layer axially spans from about 30 to about 80 percent of the running surface of the tread cap rubber layer and the two lateral tread rubber zone rubber layers collectively span from about 20 to about 70 percent of the running surface of the tread cap rubber layer where said span of running surface of the tread includes the running surfaces of the tread lugs and widths of the tread grooves between the tread lugs.

In one embodiment, the span of the running surfaces of the two individual lateral tread zones may be of equal widths, or at least of substantially equal widths, or may be asymmetrical in a sense that they are of unequal widths, namely, for example, of widths within about 80 to about 120 percent of each other.

As indicated, the span of the running surface of the tread cap layer includes the outer running surface of the tread lugs (intended to be ground contacting) and the width of the included grooves between the lugs.

In one embodiment, the Grosch abrasion rate (e.g. Grosch high abrasion rate) of the rubber composition of the running surfaces of the intermedial tread rubber layer and lateral tread zone rubber layers are desirably similar. For example, in one embodiment their Grosch abrasion rates may be within about 5 to 20 percent of each other.

In one embodiment, the tear resistance (Newtons at 95° C.) of the rubber composition of the lateral tread zones is at least 20 percent greater than the tear resistance of the rubber composition of the intermedial tread zone.

In one embodiment, the lateral tread zones, intermedial tread zone and underlying tread base are co-extruded together to form an integral and unified tread composite.

In one embodiment, the rubber composition of the inter-medial, tread cap zone has a lower tan delta value at 10 percent strain (100° C.) than the rubber composition of the two lateral tread cap zones which is predictive of lower hysteresis which is, in turn, predictive of lower internal heat buildup during tire service and a beneficially lower rolling resistance contribution of the intermedial tread cap rubber layer for the tire.

Accordingly, it is an aspect of this invention to provide a significant balance of physical properties of rubber compositions between the intermedial tread zone and stratified lateral tread zones in a manner of being a departure from past practice.

It is to be appreciated that one having skill in rubber compounding for tire treads can readily provide the tread zones with the indicated rubber composition properties with routine experimentation and without undue experimentation.

BRIEF DESCRIPTION OF THE DRAWINGS

Drawings are presented as FIG. 1, FIG. 2, FIG. 3 and FIG. 4 to provide a further understanding of the invention.

ADDITIONAL DESCRIPTION OF THE DRAWINGS

Figure 1:
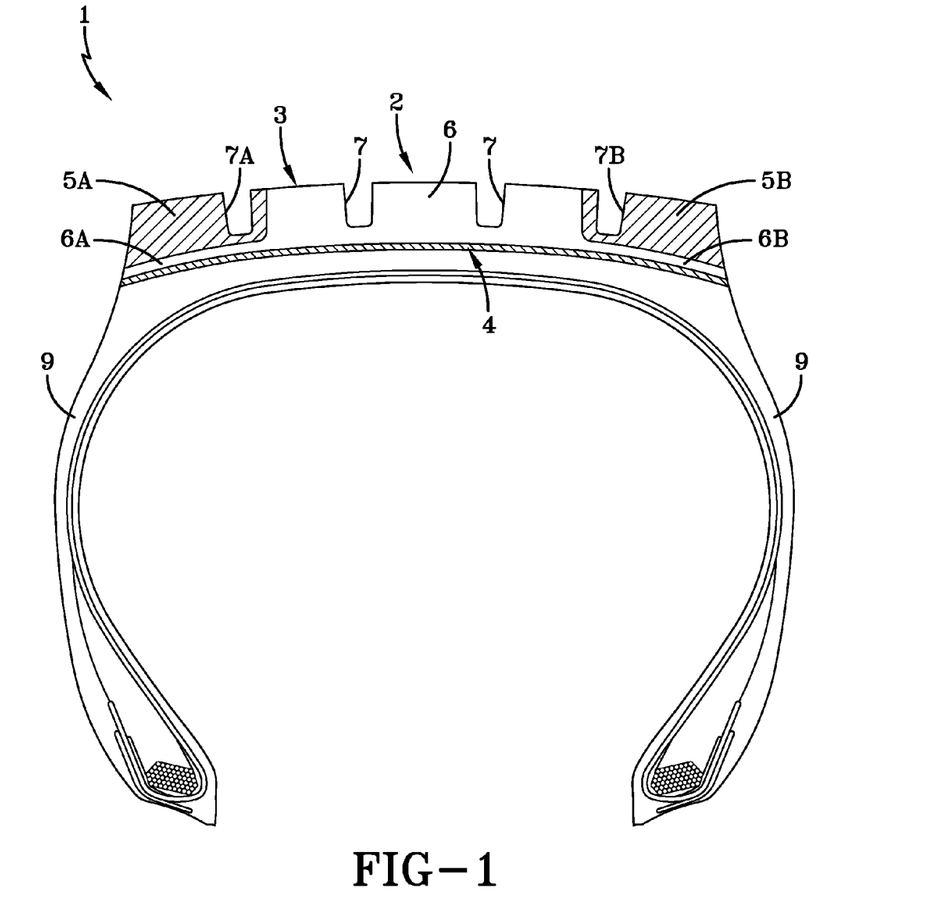
FIG. 1 is provided to illustrate a partial cross sectional view of a tire with a circumferential tread of a cap/base configuration where the outer cap rubber layer is divided into three circumferential tread zones.

FIG. 1 illustrates the tire with two spaced apart rubber reinforcing carbon black-rich lateral tread zone rubber layers and a precipitated silica rich-intermedial tread zone rubber layer of which a portion extends in an axially outward direction from each side of the intermedial tread zone beneath the lateral tread zones and thereby joins and separates the lateral tread zones from each other.

Figure 2:
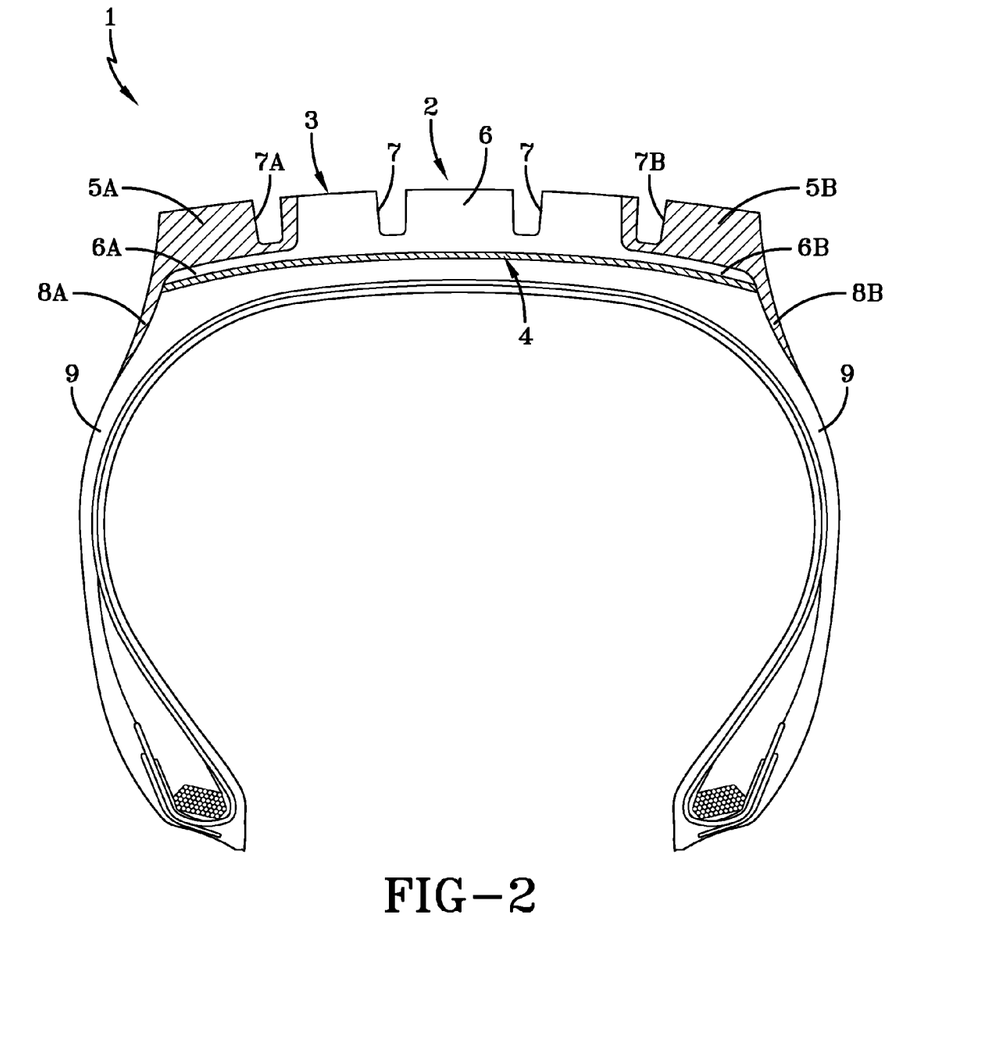
FIG. 2 represents the tire of FIG. 1 with a path of least electrical resistance extending between a carbon black-rich lateral tread rubber zone and carbon black-rich tread base rubber layer.

FIG. 2 illustrates the tire of FIG. 1 where the tread base rubber layer is an extension of the carbon black-rich lateral tread rubber zone.

Figure 3:
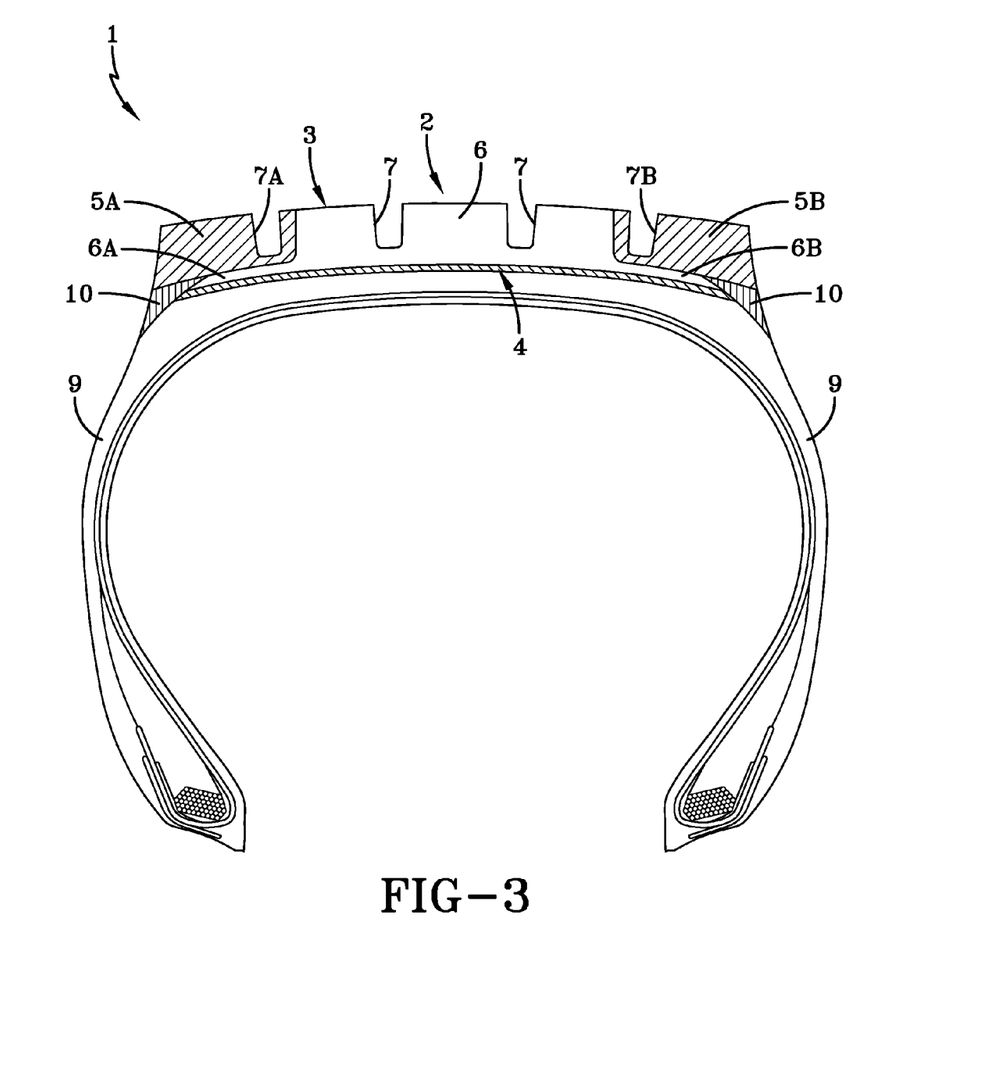
FIG. 3 represents the tire of FIG. 1 with a path of least electrical resistance extending between a carbon black-rich lateral tread rubber zone and carbon black-rich tread base rubber layer.

FIG. 3 illustrates the tire of FIG. 1 where the path of least electrical resistance is comprised of a rubber reinforcing carbon black-rich rubber bridge component.

Figure 4:
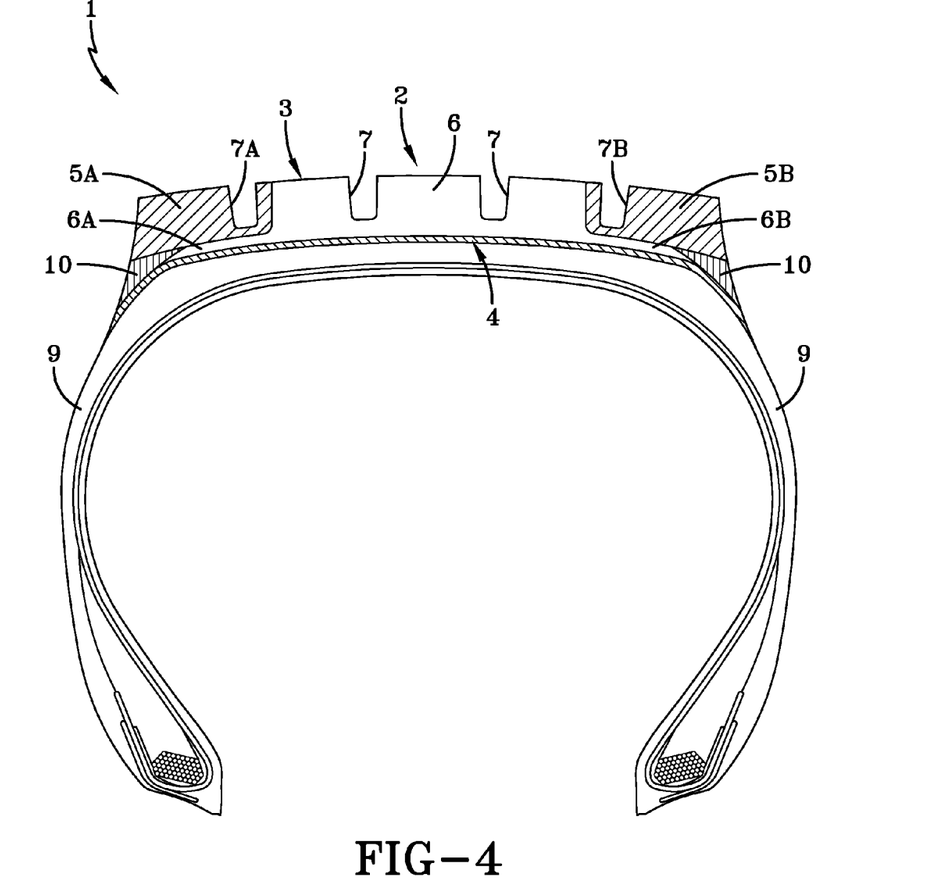
FIG. 4 also represents the tire of FIG. 1 with a path of least electrical resistance extending between a carbon black-rich lateral tread rubber zone and carbon black-rich tread base rubber layer.

FIG. 4 also illustrates the tire of FIG. 1 where the path of least electrical resistance includes a rubber reinforcing black-rich rubber bridge component similar to FIG. 3 for which the tread base rubber layer is illustrated as extending beneath the carbon black-rich bridge component and optionally axially outward to the outer surface of the tire sidewall.

The Drawings

In the Drawings, FIG. 1 illustrates a pneumatic tire partial cross section (1) having a tread (2) of a cap/base configuration, namely an outer tread cap rubber layer (3) of a lug and groove configuration and an underlying tread base rubber layer (4). The outer tread cap rubber layer (3) contains tread running surfaces (not numbered) contained on the outer surfaces of the tread lugs of the tread (2) and is composed of three circumferential tread zones, each a part of the tread's running surface, comprised of a silica-rich intermedial tread zone rubber layer (6) between two spaced apart individual carbon black-rich lateral tread rubber zones (5A) and (5B) of which portions (6A) and (6B) of the intermedial tread zone (6) extend beneath and thereby underlie both of the lateral tread zones (5A) and (5B) and also overlay the carbon black-rich tread base rubber layer (4). The outlying lateral tread zones (5A) and (5B) are thereby spaced apart from each other. The carbon black-rich tread base rubber layer (4) thereby underlies the silica-rich intermedial tread zone rubber layer (6) and is exclusive of the carbon black-rich lateral tread zones (5A) and (5B). The lateral tread zones (5A) and (5B) are shown as being of the same width although they may be of widths which differ from each other.

The silica-rich rubber composition of the intermedial tread zone (6) contains at least 40 phr of precipitated silica reinforcement and a maximum of 30 phr of rubber reinforcing carbon black which therefore renders the intermedial tread rubber composition electrically resistive relative to carbon black-rich lateral tread zone rubber compositions.

The rubber reinforcing carbon black-rich rubber compositions of the lateral tread zones (5A) and (5B), tread base rubber layer (4) and sidewall rubber layer (9), as well as the bridging rubber component (10) shown in FIG. 3 and in FIG. 4, each contain at least 40 phr rubber reinforcing carbon black which renders them relatively less electrically resistive, therefore relatively more electrically conductive, than the rubber composition of the precipitated silica-rich intermedial tread rubber zone.

The tread lug and groove configuration of the tread cap rubber layer provides tread lugs with intervening grooves with grooves (7) contained in the intermedial tread zone layer (6) and grooves (7A) and (7B) contained in the lateral tread zone layers (5A) and (5B) with each of the lateral tread zones thereby containing at least one tread groove. For such purpose, it is desired that the lateral tread zone layer rubber compositions have a significantly greater tear resistance property than the intermedial zone layer rubber composition to thereby aid in protecting the tread grooves (7A) and (7B) contained in the stratified lateral tread zone layers (5A) and (5B).

For FIG. 1, the intermedial tread zone (6) is depicted as constituting about 45 to 60 percent of the spanned running surface of the tire tread (2) and the two individual lateral tread zone layers (5A) and (5B) are of a substantially equal width and correspondingly collectively constitute about 55 to about 40 percent of the spanned running surface of the tire tread (2).

For exemplary FIG. 1, the intermedial and stratified lateral tread zone rubber compositions may be comprised of the same or different elastomers so long as the 100° C. hot rebound property of the intermedial zone rubber is greater than that of the stratified lateral zone rubbers.

As indicated, the span of the running surface of the tread cap layer includes the outer running surface of the tread lugs (intended to be ground contacting) and the width of the included grooves between the lugs.

For FIG. 2, a path of least electrical resistance is provided between the carbon black-rich lateral tread rubber zones (5A) and 5(B) to the carbon black rich tread base rubber layer (4) by an extension (8) of lateral tread rubber zones (5A) and (5B) which extends from the lateral tread zone to and joins the tread base rubber layer (4) and optionally also joins and overlays the carbon black-rich tire sidewall (9).

For FIG. 3 and FIG. 4, a path of least electrical resistance is provided between the carbon black-rich lateral tread rubber zones (5A) and 5(B) and the carbon black rich tread base rubber layer (4) by a carbon black-rich bridge rubber component (10) which is positioned between and joins the lateral tread rubber zones (5A) and (5B) and tread base rubber layer (4).

FIG. 4 differs from FIG. 3 in a sense that the tread base rubber layer (4) extends axially outward beneath (and in contact with by joining) the bridge rubber component (10). For FIG. 4, the tread base rubber layer (4) is illustrated as extending axially outward beneath the bridge rubber component (10) to the outer surface of the tire sidewall (9).

For FIGS. 1, 2, 3 and 4, the tread base rubber layer (4) may, for example, be primarily comprised of either cis 1,4-polyisoprene rubber, preferably natural rubber, or a combination of the cis 1,4-polyisoprene rubber and a polybutadiene rubber selected from cis 1,4-polybutadiene rubber and trans 1,4-polybutadiene rubber. Optionally, also it may also contain up to about 20 phr (e.g. from about 5 to about 15 phr) of at least one additional conjugated diene based elastomer such as, for example, at least one additional diene-based elastomer selected from at least one of styrene/butadiene rubber, isoprene/butadiene rubber, trans 1,4-polybutadiene, low vinyl polybutadiene having vinyl content in a range of 10 to about 40 percent, and styrene/isoprene/butadiene rubber, preferably a styrene/butadiene copolymer rubber.

In practice, the coupling agent for the precipitated silica reinforcement of the respective zones of the tread may be, for example, an alkoxysilyl polysulfide such as for example, a bis(3-trialkoxysilylalkyl)polysulfide wherein alkyl radicals for said alkoxy groups are selected from one or more of methyl and ethyl radicals, preferably an ethyl radical and the alkyl radical for said silylalkyl component is selected from butyl, propyl and amyl radicals, preferably a propyl radical and wherein said polysulfide component contains from 2 to 8, with an average of from 2 to 2.6 or an average of from 3.5 to 4, connecting sulfur atoms in its polysulfidic bridge, preferably an average of from 2 to 2.6 connecting sulfur atoms to the exclusion of such polysulfides having greater than 2.6 connecting sulfur atoms.

Representative of such coupling agents are, for example, bis(3-triethoxysilylpropyl)polysulfide having an average of from 2 to 2.6 or an average of from 3.5 to 4, connecting sulfur atoms in its polysulfidic bridge, sometimes preferably an average of from 2 to 2.6 connecting sulfur atoms to the exclusion of a bis(3-triethoxysilylpropyl)polysulfide containing an average of greater than 2.6 connecting sulfur atoms in its polysulfidic bridge.

Such coupling agent may, for example, be added directly to the elastomer mixture or may be added as a composite of precipitated silica and such coupling agent formed by treating a precipitated silica therewith or by treating a colloidal silica therewith and precipitating the resulting composite.

In practice, the synthetic amorphous silica (precipitated silica) may be aggregates of precipitated silica, which is intended to include precipitated aluminosilicates as a co-precipitated silica and aluminum.

Such precipitated silica is, in general, well known to those having skill in such art. For example, such precipitated silica may be precipitated by controlled addition of an acid such as, for example, hydrochloric acid or sulfuric acid, to a basic solution (e.g. sodium hydroxide) of a silicate, for example, sodium silicate, usually in the presence of an electrolyte, for example, sodium sulfate. Primary, colloidal silica particles typically form during such process which quickly coalesce to form aggregates of such primary particles and which are then recovered as precipitates by filtering, washing the resulting filter cake with water or an aqueous solution, and drying the recovered precipitated silica. Such method of preparing precipitated silica, and variations thereof, are well known to those having skill in such art.

The precipitated silica aggregates preferably employed in this invention are precipitated silicas such as, for example, those obtained by the acidification of a soluble silicate, e.g., sodium silicate and may include co-precipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 $cm^3/100$ g, and more usually about 100 to about 300 $cm^3/100$ g.

Various commercially available precipitated silicas may be considered for use in this invention such as, only for example herein, and without limitation, silicas from PPG Industries under the Hi-Sil trademark with designations Hi-Sil 210, Hi-Sil 243, etc.; silicas from Rhodia as, for example, Zeosil 1165MP and Zeosil 165GR, silicas from J. M. Huber Corporation as, for example, Zeopol 8745 and Zeopol 8715, silicas from Degussa AG with, for example, designations VN2, VN3 and Ultrasil 7005 as well as other grades of silica, particularly precipitated silicas, which can be used for elastomer reinforcement.

Representative examples of other silica couplers may be organomercaptosilanes such as, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

For this invention, it is desirable for physical properties of the sulfur cured rubber compositions of the tire tread zones to be as presented in the following Table A.

TABLE A

| | |
|---|---|
| Intermedial zone rubber composition rebound (Zwick) value (100° C.), as a percent | At least 4 units greater than the rubber of the lateral tread zones |
| Intermedial zone rubber composition Tan Delta value (1 Hertz, 15% strain, 100° C.) KPa | At least 15 percent less than the rubber of the lateral tread zones |
| Lateral zone rubber composition tear resistance, 95° C., in Newtons | At least 20 percent greater than the rubber of the intermedial tread zone |

The tear resistance may be determined, for example, by ASTM D1876-1 taken with DIN 53539 using a 5 mm wide tear width provided by a longitudinal open space, sometimes referred to as a window, cut or otherwise provided, in the film positioned between the two rubber test pieces where the window provides a geometrically defined area, namely the tear width, for portions of two rubber test pieces to be pressed and cured together after which the force to pull the test pieces apart is measured.

In practice, the invention the rubber compositions for the tire tread components may be prepared in a sequential series of at least two separate and individual preparatory internal rubber mixing steps, or stages, in which the diene-based elastomer is first mixed with the prescribed carbon black and/or silica in a subsequent, separate mixing step and followed by a final mixing step where curatives are blended at a lower temperature and for a substantially shorter period of time.

It is conventionally required after each mixing step that the rubber mixture is actually removed from the rubber mixer and cooled to a temperature of less than 40° C. and, for example, in a range of about 40° C. to about 20° C. and then added back to an internal rubber mixer for the next sequential mixing step, or stage.

The forming of a tire component is contemplated to be by conventional means such as, for example, by extrusion of rubber composition to provide a shaped, unvulcanized rubber component such as, for example, a tire tread. Such forming of a tire tread is well known to those having skill in such art.

It is understood that the tire, as a manufactured article, is prepared by shaping and sulfur curing the assembly of its components at an elevated temperature (e.g. 140° C. to 180° C.) and elevated pressure in a suitable mold. Such practice is well known to those having skill in such art.

It is readily understood by those having skill in the art that the rubber composition would be compounded by methods generally known in the rubber compounding art, such as mixing the various sulfur-vulcanizable constituent rubbers with various commonly used additive materials, as herein before discussed, such as, for example, curing aids such as sulfur, activators, retarders and accelerators, processing additives, such as rubber processing oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of fatty acids, if used which may be comprised of stearic acid which may also contain at least one of palmitic and oleac acids, may comprise about 0.5 to about 3 phr. Typical amounts of zinc oxide comprise about 1 to about 5 phr. Typical amounts of waxes, if used, comprise about 1 to about 5 phr. Often microcrystalline waxes are used. Typical amounts of peptizers, if used, comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can preferably be accomplished by the aforesaid sequential mixing process. For example, the ingredients may be mixed in at least three stages, namely, at least two non-productive (preparatory) stages followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

EXAMPLE I

Proposed rubber compositions were prepared for use for the intermedial and lateral tread zone rubber layers for the tire of this invention. The proposed intermedial tread zone rubber composition is referred in this Example as rubber Sample A.

The proposed lateral tread zone rubber composition is referred in this Example as rubber Sample B.

The basic rubber composition formulations are shown in Table 1 and the ingredients are expressed in terms of parts by weight per 100 parts rubber (phr) unless otherwise indicated.

The rubber composition may be prepared by mixing the elastomers(s) without sulfur and sulfur cure accelerators in a first non-productive mixing stage (NP-1) in an internal rubber mixer, for example, for about 4 minutes to a temperature of, for example, of about 160° C. If desired, the rubber mixture may then mixed in a second non-productive mixing stage (NP-2) in an internal rubber mixer, for example, for about 4 minutes to a temperature of, for example, about 160° C. with or without adding additional ingredients. The resulting rubber mixture may then be mixed in a productive mixing stage (PR) in an internal rubber mixer with sulfur and sulfur cure accelerator(s), for example, for about 2 minutes to a temperature of, for example, about 110° C. The rubber composition may then sheeted out and cooled to, for example, below 50° C. between each of the non-productive mixing steps and prior to the productive mixing step. Such rubber mixing procedure is well known to those having skill in such art.

The following Table 1 presents basic rubber formulations for proposed intermedial tire tread zone (rubber Sample A) and peripheral tire tread zone (rubber Sample B) rubber compositions for the zoned tread of this invention.

TABLE 1

(Intermedial and Lateral Tread Cap Zones)

| | Parts (phr) | |
|---|---|---|
| | A (Intermedial) | B (Lateral) |
| Non-productive Mix Step (NP1) | | |
| Natural cis 1,4-polyisoprene rubber (TTR20) | 35 | 35 |
| Cis 1,4-polybutadiene rubber[1] | 65 | 65 |
| Carbon black (N121) | 35 | 35 |
| Silica, precipitated[2] | 15 | 15 |
| Silica coupling agent[3] | 2 | 0 |
| Composite of silica coupling agent and carbon black (50/50 weight ratio)*[4] | 0 | 2 |
| Wax microcrystalline and paraffin | 1.5 | 1.5 |
| Fatty acid[5] | 2 | 2 |
| Antioxidants | 4 | 4 |
| Zinc oxide | 3 | 3 |

TABLE 1-continued (Intermedial and Lateral Tread Cap Zones)

| | Parts (phr) | |
|---|---|---|
| | A (Intermedial) | B (Lateral) |
| Final Mix Step (PR) | | |
| Sulfur | 1.1 | 0.9 |
| Accelerator(s)[6] | 1.6 | 1.5 |

*Therefore 1 phr of coupling agent and 1 phr rubber reinforcing carbon black.
[1]Cis 1,4-polybutadiene rubber (said organic solvent solution polymerized 1,3-butadiene monomer in the presence of a neodymium catalyst) as CB25 ™ from the Lanxess Company having a Tg of about −105° C. and heterogeneity index in a range of from about 1.5/1 to about 2.2/1
[2]Precipitated silica as Zeosil ™ Z1165 MP from the Rhodia Company
[3]Silica coupling agent comprised of bis(3-triethoxysilylpropyl) polysulfide having an average of from about 2 to about 2.6 connecting sulfur atoms as Si266 ™ from Evonic
[4]Composite of silica coupling agent and carbon black (carrier) in a 50/50 weight ratio where said coupling agent is comprised of bis(3-triethoxysilylpropyl) polysulfide having an average of from about 2 to about 2.6 connecting sulfur atoms as Si266 ™ from Evonic
[5]Mixture comprised of stearic, palmitic and oleic acids
[6]Sulfenamide with diphenyl guanidine sulfur cure accelerators with retarder as needed The following Table 2 represents the uncured and cured behavior and various physical properties of the rubber compositions for the intermedial (rubber Sample A) and lateral (rubber Sample B) tire tread zone rubber layers based upon the basic formulations illustrated in Table 1.

TABLE 2

| Properties | A (Intermedial) | B (Lateral) |
|---|---|---|
| RPA (Rubber Process Analyzer) test[1] | | |
| Dynamic storage modulus (G') | | |
| Cured rubber G' (1 Hertz, 10% strain, 100° C.), KPa | 1.79 | 1.49 |
| Tan delta (1 Hertz, 10% strain, 100° C.) | 0.091 | 0.122 |
| Stress-strain, ATS[2] | | |
| Tensile strength (MPa) | 21.2 | 20.8 |
| Elongation at break (%) | 461 | 529 |
| 300% modulus, ring, (MPa) | 12.1 | 9.66 |
| Rebound (Zwick) | | |
| 23° C. | 59 | 55 |
| 100° C. | 69 | 64 |
| Shore A Hardness | | |
| 23° C. | 65 | 63 |
| 100° C. | 61 | 58 |
| Tear strength (tear resistance)[3], N at 95° C. | 88 | 121 |
| Abrasion rate (mg/km), Grosch[4] high severity (70 N), 12° slip angle, disk speed = 20 km/hr., distance = 250 meters | 369 | 368 |

[1]RPA, rubber property analytical instrument
[2]Automated Test System instrument (ATS), Instron Corporation, which incorporates a number of tests in one analytical system and reports data from the tests such as, for example, ultimate tensile strength, ultimate elongation, modulii and energy to break data.
[3]Data obtained according to a tear strength (peal adhesion), or tear resistance test. The tear resistance may be determined by ASTM D1876-01 taken with DIN 53539 using a 5 mm wide tear width provided by a longitudinal open space, sometimes referred to as a window, cut or otherwise provided, in the film positioned between the two rubber test pieces where the window provides a geometrically defined area, namely tear width, for portions of two rubber test pieces to be pressed and cured together after which the ends of the two test pieces are pulled apart at right angles (90° + 90° = 180° to each other) and the force to pull the test pieces apart is measured. An Instron instrument may be used to pull the rubber pieces apart using an Instron instrument at 95° C. with the force required being reported as Newtons force.
[4]The Grosch high severity abrasion rate may be conducted on an LAT-100 Abrader and is measured in terms of mg/km of rubber abraded away. The test rubber sample is placed at a slip angle under constant load (Newtons) as it traverses a given distance on a rotating abrasive disk (disk from HB Schleifmittel GmbH). In practice, a high abrasion severity test may be run, for example, at a load of 70 Newtons, 12° slip angle, disk speed of 20 km/hr and distance of 250 meters.

It is seen in Table 2 that the Experimental rubber Sample A (rubber composition proposed for the intermedial tread zone) and Experimental rubber Sample B (rubber composition proposed for the lateral tread zones) fulfilled the beneficially desired physical property relationships presented in Table A for 100° C. hot rebound, and tear resistance (95° C.) values.

In Table 2 it is seen that the rebound value for rubber Sample A (proposed intermedial tread zone rubber composition) was greater than the for rubber Sample B (proposed peripheral tread zone rubber composition) which is indicative of beneficially lower hysteresis which in turn is predictive of a beneficially lower rate of internal heat generation in the intermedial tread zone rubber composition as well as predictively beneficial reduction of rolling resistance for the tire with a resulting predictive fuel economy for a vehicle using such tires.

Further, in Table 2 it is seen that tear resistance for rubber Sample B (proposed lateral tread zone rubber composition) was beneficially significantly greater than for rubber Sample A (proposed intermedial tread zone rubber composition).

Further, it is seen in Table 2 that the high severity Grosch rates of abrasion for both rubber Sample A (proposed intermedial tread zone rubber) and rubber Sample B (lateral tread zone rubber) are similar, which is a desirable feature.

Further, it is seen in Table 2 that the tangent delta (tan delta) value for rubber Sample B (proposed lateral tread zone rubber) is greater than for rubber Sample A (proposed intermedial tread zone rubber). Such tan delta properties, taken with the aforesaid rebound properties, are a further indication of lower hysteresis, lower internal heat generation during tire service for the intermedial tread rubber zone as well as the aforesaid predictive beneficial promotion of reduction in tire rolling resistance for increased vehicular fuel economy.

In summary and conclusion, a tire is provided with a configured circumferential tread zones to provide a running surface with zones having similar rates of abrasion resistance but with lower hysteresis in the intermedial tread zone which extends axially outward beneath the higher hysteresis lateral tread zones for a purpose of maximizing such lower hysteresis for the tread and with a higher tear resistance for the lateral tread rubber zone to promote resistance to groove surface cracking in tread groove(s) contained in the lateral tread zones.

Such innovative tread configuration is intended to promote lower rolling resistance for the tire tread across the width of the tread by the extended intermedial tread zone which extends axially outward beneath the lateral tread zones and to beneficially promote tear resistance for the outlying lateral tread zones, the combination of which is considered to be a significant departure from past practice.

While certain representative embodiments and details have been shown for the purpose of illustrating the invention, it will be apparent to those skilled in this art that various changes and modifications may be made therein without departing from the spirit or scope of the invention.

What is claimed is:

1. A tire is provided having a circumferential rubber tread composed of a cap/base configuration comprised of an outer tread cap rubber layer with a lug and groove configuration with the outer portions of the tread lugs providing the running surface of the tread, and a tread base rubber layer underlying the outer tread cap rubber layer;

wherein the outer tread cap rubber layer is composed of three circumferential load bearing zones comprised of a silica-rich intermedial tread zone rubber layer positioned between and extending beneath two carbon black-rich lateral tread zone rubber layers to thereby underlie the lateral tread zone rubber layers and overlay the carbon black-rich tread base rubber layer;

wherein outer tread lug surfaces of the intermedial tread zone rubber layer and the lateral tread zone rubber layers comprise the running surface of the tread;

wherein rubber composition of the intermedial tread zone rubber layer has a 100° C. hot rebound property greater than the 100° C. hot rebound property of the rubber composition of said lateral tread zone rubber layers, wherein a path of least electrical resistance extends from said carbon black-rich lateral rubber tread zone to the carbon black-rich tread base rubber layer by an extension of a lateral tread zone layer which extends to and joins said tread base rubber layer or by an intermediate carbon black-rich rubber bridge which extends between and joins said lateral tread zone rubber layer and said tread base rubber layer, wherein the silica-rich rubber composition of the intermedial tread zone rubber layer contains at least 40 phr of precipitated silica and a maximum of 30 phr of rubber reinforcing carbon black and is therefore relatively electrical resistive, wherein the rubber reinforcing carbon black-rich rubber compositions of the lateral tread zone rubber layer, tread base rubber layer and rubber bridge contains at least 40 phr of rubber reinforcing carbon black.

2. The tire of claim 1 wherein the value of the 100° C. hot rebound property of the intermedial tread zone rubber composition is at least about 4 units greater than the 100° C. hot rebound property value of the lateral tread zone rubber composition.

3. The tire of claim 1 wherein the 100° C. hot rebound value of the intermedial tread zone rubber composition is in arrange of from about 60 to about 80 percent and the 100° C. hot rebound value of the rubber composition of the lateral tread zone rubber composition is in a range of from about 56 to about 76 so long as the 100° C. rebound values differ by at least about 4 units.

4. The tire of claim 1 wherein the lateral tread zone rubber composition has an at least 20 percent greater tear resistance property than the intermedial tread zone rubber and where the intermedial and lateral tread zones are configured with lugs and intervening grooves with each lateral tread zone containing at least one tread groove.

5. The tire of claim 1 wherein the elastomers of the rubber compositions of the intermedial tread rubber zone and lateral tread rubber zones are the same or different so long as the 100° C. hot rebound property of the rubber composition of the intermedial tread rubber zone is greater than the 100° C. hot rebound property of the rubber composition of the lateral rubber zones.

6. The tire of claim 1 wherein the span of the running surface of the intermedial tread zone rubber layer axially spans from about 30 to about 80 percent of the running surface of the tread cap rubber layer and the two lateral tread rubber zone rubber layers collectively span from about 20 to about 70 percent of the running surface of the tread cap rubber layer where said span of running surface of the tread includes the running surfaces of the tread lugs and widths of the tread grooves between the tread lugs.

7. The tire of claim 6 wherein the span of running surfaces of the two individual lateral tread zones are of substantially equal widths.

8. The tire of claim 6 wherein the span of running of the two individual lateral tread zones is asymmetrical in a sense that they are of unequal widths.

9. The tire of claim 1 wherein the Grosch high severity abrasion rate of the rubber compositions of the running surfaces of the intermedial tread zone running surface and lateral tread zone are desirably similar.

10. The tire of claim 1 wherein the lateral tread zones, intermedial tread zone and underlying tread base are co-extruded together to form an integral and unified tread composite.

11. The tire of claim 1 wherein the rubber of the intermedial, tread cap zone has a lower tan delta value at 10 percent strain (100° C.) than the rubber of the two lateral tread cap zones.

12. The tire of claim 1 wherein the tear resistance (Newtons at 95° C.) of the rubber composition of the lateral tread zone rubber is at least 20 percent greater than the tear resistance of the rubber composition of the intermedial tread zone.

13. The tire of claim 1 wherein the intermedial and lateral tread zones are configured with lugs and intervening grooves with the lateral tread zones each containing at least one tread groove.

* * * * *